(12) United States Patent
Muta et al.

(10) Patent No.: US 7,974,759 B2
(45) Date of Patent: Jul. 5, 2011

(54) CONTROL DEVICE FOR VEHICLE, AND CONTROL METHOD THEREOF

(75) Inventors: Koichiro Muta, Okazaki (JP);
Katsuhiko Yamaguchi, Nisshin-shi (JP);
Eiji Masuda, Toyota (JP)

(73) Assignees: Toyota Jidosha Kabushiki Kaisha, Aichi-ken (JP); Denso Corporation, Aichi-pref (JP)

( * ) Notice: Subject to any disclaimer, the term of this patent is extended or adjusted under 35 U.S.C. 154(b) by 398 days.

(21) Appl. No.: 12/161,838

(22) PCT Filed: Feb. 6, 2007

(86) PCT No.: PCT/IB2007/000322
§ 371 (c)(1),
(2), (4) Date: Jul. 23, 2008

(87) PCT Pub. No.: WO2007/091172
PCT Pub. Date: Aug. 16, 2007

(65) Prior Publication Data
US 2009/0088919 A1    Apr. 2, 2009

(30) Foreign Application Priority Data
Feb. 8, 2006  (JP) .................. 2006-031388

(51) Int. Cl.
*G06F 17/00*  (2006.01)

(52) U.S. Cl. ....................................................... 701/69
(58) Field of Classification Search ..................... 701/54, 701/69, 81
See application file for complete search history.

(56) References Cited

U.S. PATENT DOCUMENTS

| | | | |
|---|---|---|---|
| 6,484,832 B1 | 11/2002 | Morisawa et al. | |
| 6,549,840 B1 | 4/2003 | Mikami et al. | |
| 7,151,991 B2 * | 12/2006 | Iida ................................. | 701/69 |
| 7,396,316 B2 * | 7/2008 | Tabata et al. .................. | 477/107 |
| 2004/0176899 A1 | 9/2004 | Hallowell | |

FOREIGN PATENT DOCUMENTS

| | | |
|---|---|---|
| EP | 1 533 166 A2 | 5/2005 |
| JP | 06-183280 A | 7/1994 |
| JP | 2001-171378 A | 6/2001 |

* cited by examiner

*Primary Examiner* — Kim T Nguyen
(74) *Attorney, Agent, or Firm* — Sughrue Mion, PLLC

(57) ABSTRACT

A drive force control portion firstly changes a front wheel command torque (Tfcm) and a rear wheel command torque (Trcm) so that each command torque reaches a torque in a predetermined range. The drive force control portion releases the restriction on the change of the rear wheel command torque (Trcm) after the front wheel command torque (Tfcm) and the rear wheel command torque (Trcm) have entered the predetermined range. Therefore, it becomes possible to improve the vehicle stability in a vehicle that includes a plurality of power sources that drives a plurality of wheels.

7 Claims, 7 Drawing Sheets

FIG. 5

| CONDITION | REQUESTED TORQUE | FRONT WHEEL COMMAND TORQUE | REAR WHEEL COMMAND TORQUE | PROCESSING |
|---|---|---|---|---|
| 1 | $\geq 0$ | $\geq 0$ | $< -\text{Tpxnoarea}$ | FRONT WHEEL TORQUE RISE PROHIBITED |
| 2 | $\geq 0$ | $\geq 0$ | $\geq -\text{Tpxnoarea}$ | — |
| 3 | $\geq 0$ | $< -\text{Tpxnoarea}$ | $\geq 0$ | REAR WHEEL TORQUE RISE PROHIBITED |
| 4 | $\geq 0$ | $\geq -\text{Tpxnoarea}$ | $\geq 0$ | — |
| 5 | $< 0$ | $\leq 0$ | $> \text{Tpxnoarea}$ | FRONT WHEEL TORQUE DECLINE PROHIBITED |
| 6 | $< 0$ | $\leq 0$ | $\leq \text{Tpxnoarea}$ | — |
| 7 | $< 0$ | $> \text{Tpxnoarea}$ | $\leq 0$ | REAR WHEEL TORQUE DECLINE PROHIBITED |
| 8 | $< 0$ | $\leq \text{Tpxnoarea}$ | $\leq 0$ | — |

CONTROL DEVICE FOR VEHICLE, AND CONTROL METHOD THEREOF

BACKGROUND OF THE INVENTION

1. Field of the Invention

The invention relates to a control device, more particularly, relates to a control device for a vehicle that includes a plurality of power sources that drives a plurality of wheels, and to a control method thereof.

2. Description of the Related Art

A vehicle that includes a plurality of power sources that drives a plurality of wheels, and a control device for such a vehicle are known. For example, Japanese Patent Application Publication No. JP-A-2001-171378 discloses a control device for a four-wheel drive vehicle in which either group of the front wheels and the rear wheels are capable of being driven by a first motor and the wheels of the other group are capable of being driven by a second motor.

This control device finds a target drive force on the basis of the degree of driver's operation of output operating means, and of the vehicle speed. Then, the control device controls the front wheel drive force and the rear wheel drive force for outputting the target drive force from the front wheel side and the rear wheel side on the basis of the state of the vehicle or the operation state of the vehicle.

In the four-wheel drive vehicle as described above, the front wheel drive force and the rear wheel drive force are determined by distributing the target drive force to the front wheel side and to the rear wheel side. The drive forces based on this distribution are transmitted to the front wheels and the rear wheels. However, in the four-wheel drive vehicles as described above, the rate of change of the drive force against time is restricted with a certain constant value, taking into consideration the vehicle stability and the influence on the vehicle behavior when the drive force is transmitted to the front wheels and to the rear wheels. In some cases, the rate of change of the drive force is different between the front wheels and the rear wheels.

If the drive force is controlled in this way, it can happen that the drive force at the time of accelerating or decelerating the vehicle is different in sign between the front wheels and the rear wheels (e.g., the sign of the front wheel drive force is negative while the sign of the rear wheel drive force is positive). For example, in the case where the target drive force changes from a negative value to a positive value in order to accelerate the vehicle, the front wheel drive force and the rear wheel drive force also change from negative values to positive values. If the rear wheel drive force changes faster than the front wheel chive force, it is more likely to happen that the front wheel drive force remains a negative value although the rear wheel drive force is a positive value.

If the sign of the torque is different between the front wheels and the rear wheels, and the torque difference is large between the front wheels and the rear wheels, it is conceivable that the vehicle stability will decline, for example, in the case where the vehicle is turned on a road whose friction coefficient μ is extremely low. However, Japanese Patent Application Publication No. JP-A-2001-171378 does not disclose a concrete means of solution to this problem.

SUMMARY OF THE INVENTION

It is an object of the invention to provide a control device for a vehicle capable of improving the vehicle stability, and a control method thereof.

An aspect of the invention may be summarized to be a control device for a vehicle that includes a plurality of power sources that drives a plurality of wheels. The control device includes a requested drive force calculation portion, and a drive force control portion. The requested (hive force calculation portion calculates a plurality of requested drive forces that are requested with respect to the plurality of power sources, respectively, based on an operation state of the vehicle. The drive force control portion outputs a plurality of command drive forces to the plurality of power sources, respectively, in accordance with the plurality of requested drive forces. If a sign of at least one requested (hive force of the plurality of requested drive forces changes, the drive force control portion changes the command drive force corresponding to the at least one requested drive force to a drive force in a predetermined range. After the corresponding command drive force changes to the drive force in the predetermined range, the drive force control portion restricts a change of the corresponding command drive force until another command drive force of the plurality of command drive forces reaches the predetermined range. After the another command drive force reaches the predetermined range, the chive force control portion releases restriction on the change of the corresponding command drive force and causes the corresponding command drive force to follow the at least one requested drive force.

The drive force in the predetermined range may be astride zero. Preferably, the plurality of command drive forces is different from each other in a rate of change against passage of time.

More preferably, the plurality of power sources is a first power source and a second power source. The first power source drives two front wheels of the plurality of wheels. The second power source drives two rear wheels of the plurality of wheels.

According to the invention, it becomes possible to improve the vehicle stability in a vehicle that includes a plurality of power sources that drives a plurality of wheels.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 5 is a diagram showing the processing conditions of the torque change restriction processing portion 96 shown in FIG. 2, in the form of a table;

DETAILED DESCRIPTION OF THE PREFERRED EMBODIMENTS

Figure 1:
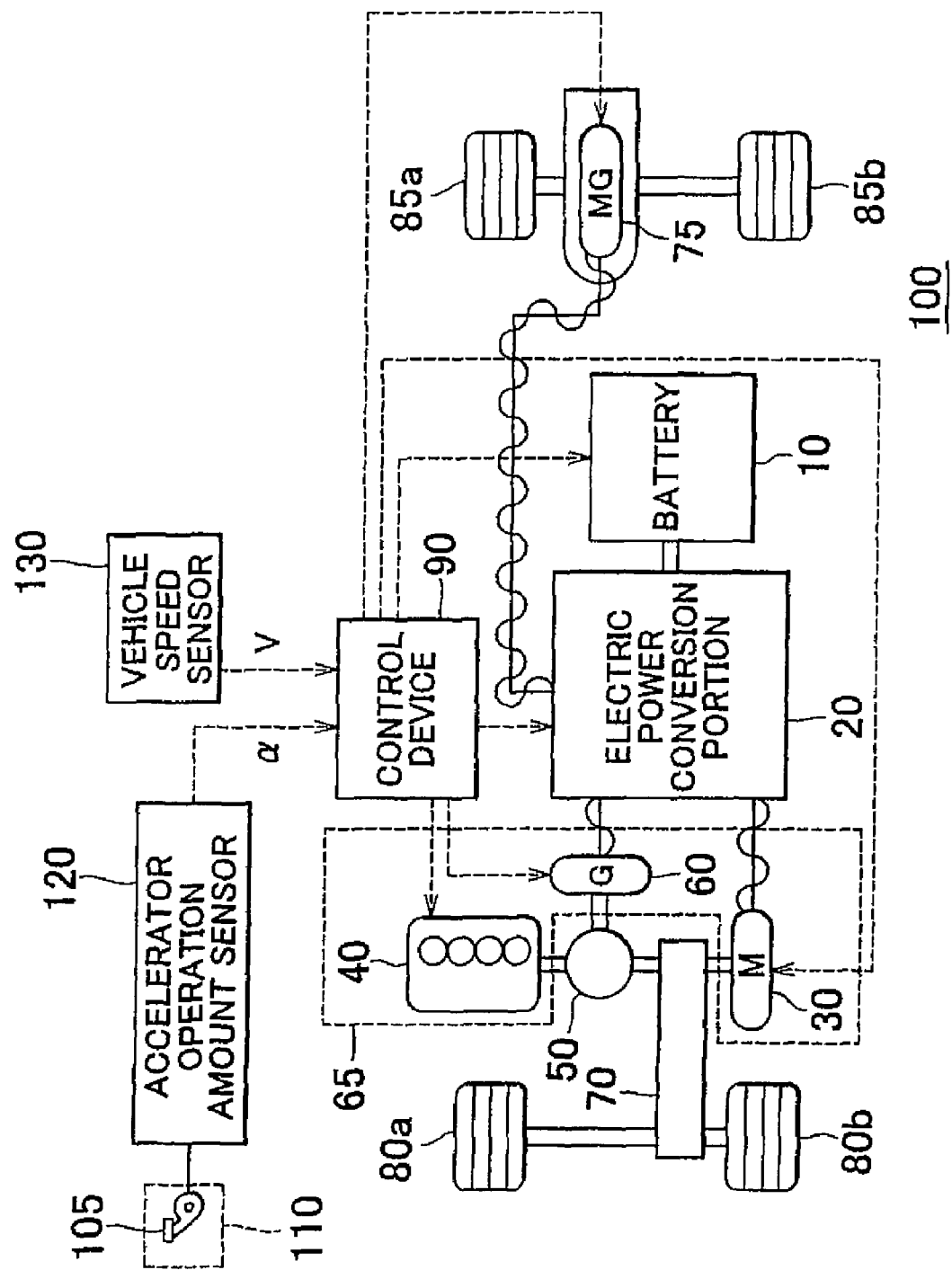
FIG. 1 is a block diagram showing an overall construction of a vehicle that is controlled by a control device of the vehicle in accordance with an embodiment of the invention.

Embodiments of the invention will be described in detail hereinafter with reference to the drawings. In the drawings, the same reference Characters represent the same or comparable portions.

FIG. 1 is a block diagram showing an overall construction of a vehicle that is controlled by a control device of the vehicle in accordance with the invention.

Referring to FIG. 1, a hybrid vehicle 100 includes a battery 10, an electric power conversion portion 20, an electric motor (motor) 30, an engine 40, a power splitting mechanism 50, an electric generator (generator) 60, a speed reducer 70, and front wheels 80a, 80b. The hybrid vehicle 100 further includes a motor generator 75, rear wheels 85a, 85b, and a control device 90. The hybrid vehicle 100 further includes an accelerator pedal device 110, an accelerator operation amount sensor 120, and a vehicle speed sensor 130.

The battery 10 is constructed of a rechargeable secondary battery (e.g., a secondary battery of a nickel metal hydride type, a lithium ion type, etc.). The electric power conversion portion 20 includes an inverter (not shown) that converts the direct-current voltage supplied from the battery 10, into alternating-current voltage for driving the motor 30 and the motor generator 75. Because this inverter is constructed so as to be capable of bidirectional electric power conversion, it has also the function of converting the electric power (alternating-current voltage) generated by the regenerative braking operation of the motor 30 or the motor generator 75 and the electric power (alternating-current voltage) generated by the generator 60, into direct-current voltage for charging the battery 10.

The electric power conversion portion 20 may further include a step-up-down converter (not shown) that performs level conversion of direct-current voltage. The disposal of such a step-up-down converter makes it possible to drive the motor 30 and the motor generator 75 with an alternating-current voltage whose amplitude is a voltage that is higher than the supply voltage from the battery 10. Therefore, the motor drive efficiency can be improved.

The engine 40 is an internal combustion engine that uses gasoline or the like as a fuel, and converts heat energy provided by the combustion of the fuel into kinetic energy that becomes drive force, and thus outputs the kinetic energy. The power splitting mechanism 50 is capable of splitting the output from the engine 40 to a path of transmission to the front wheels 80a, 80b via the speed reducer 70, and to a path of transmission to the generator 60. The generator 60 is rotated to generate electric power by the output from the engine 40 transmitted via the power splitting mechanism 50. The electric power generated by the generator 60 is used by the electric power conversion portion 20, as the charging electric power for the battery 10, or as the driving electric power for the motor 30 and the motor generator 75.

The motor 30 drives rotationally by the alternating-current voltage supplied from the electric power conversion portion 20. The output of the motor 30 is transmitted to the front wheels 80a, 80b via the speed reducer 70. Besides, the motor 30 acts as an electric generator during it is in the regenerative braking operation state which the motor 30 is rotated with deceleration of the front wheels 80a, 80b.

Similarly to the motor 30, the motor generator 75 drives rotationally by the alternating-current voltage supplied from the electric power conversion portion 20. The output of the motor generator 75 is transmitted to the rear wheels 85a, 85b via a speed reducer (not shown). Besides, the motor generator 75 acts as an electric generator during it is in the regenerative braking operation state which the motor generator 75 is rotated with deceleration of the rear wheels 85a, 85b.

The accelerator pedal device 110 sets an accelerator operation amount corresponding to the depressing force on an accelerator pedal 105 that is depressed by a driver. The accelerator operation amount sensor 120 is connected to the accelerator pedal device 110, and sends an output voltage corresponding to the accelerator operation amount α, to the control device 90.

The vehicle speed sensor 130 sends an output voltage corresponding to the vehicle speed V of the hybrid vehicle 100, to the control device 90.

At the time of vehicle launching, or the time of low-speed running, or the time of light load when the vehicle descends a gentle hill, the hybrid vehicle 100 runs using the output only from the motor 30 and the motor generator 75 without using the output of the engine 40, in order to avoid regions where the engine efficiency is low. In this case, the operation of the engine 40 stops unless the warm-up operation is needed. In the case where the warm-up operation is needed, the engine 40 operates in an idling state.

During the normal running of the vehicle, the engine 400 starts up, and the output from the engine 40 is split by the power splitting mechanism 50 to the drive force for the front wheels 80a, 80b and to the drive force for the electric power generation at the generator 60. The electric power generated by the generator 60 is used to drive the motor 30. Therefore, during the normal running of the vehicle, the output of the engine 40 combined with assist output from the motor 30 is used to drive the front wheels 80a, 80b. The control device 90 controls the power split ratio of the power splitting mechanism 50 so that the overall efficiency becomes maximum.

During acceleration, the output of the engine 40 increases. The output of the engine 40 is split by the power splitting mechanism 50 to the drive force for the front wheels 80a, 80b and to the drive force for the electric power generation at the generator 60. The electric power provided by the electric power generation of the generator 60 is used to drive the motor 30 and the motor generator 75. That is, during acceleration, the drive forces of the motor 30 and the motor generator 75 are added to the drive force of the engine 40, and the thus-obtained drive forces are used to drive the front wheels 80a, 80b and the rear wheels 85a, 85b.

During deceleration and braking, the motor 30 drives rotationally by the front wheels 80a, 80b, and generates electric power. Likewise, the motor generator 75 drives rotationally by the rear wheels 85a, 85b, and generates electric power. The electric power which is recovered by the regenerative power generation of the motor 30 and the motor generator 75, is converted to a direct-current voltage by the electric power conversion portion 20, and is used to charge the battery 10.

Thus, the hybrid vehicle 100 has the engine 40, the motor 30, the generator 60, and the motor generator 75, as a plurality of power sources. The plurality of power sources are made up of a power source 65 (a first power source) which is made up of the engine 40, the motor 30 and the generator 60, and the motor generator 75 (a second power source). The power source 65 drives the two front wheels 80a, 80b of the plurality of wheels of the hybrid vehicle 100. The motor generator 75 drives the two rear wheels 85a, 85b of the plurality of wheels.

Figure 2:
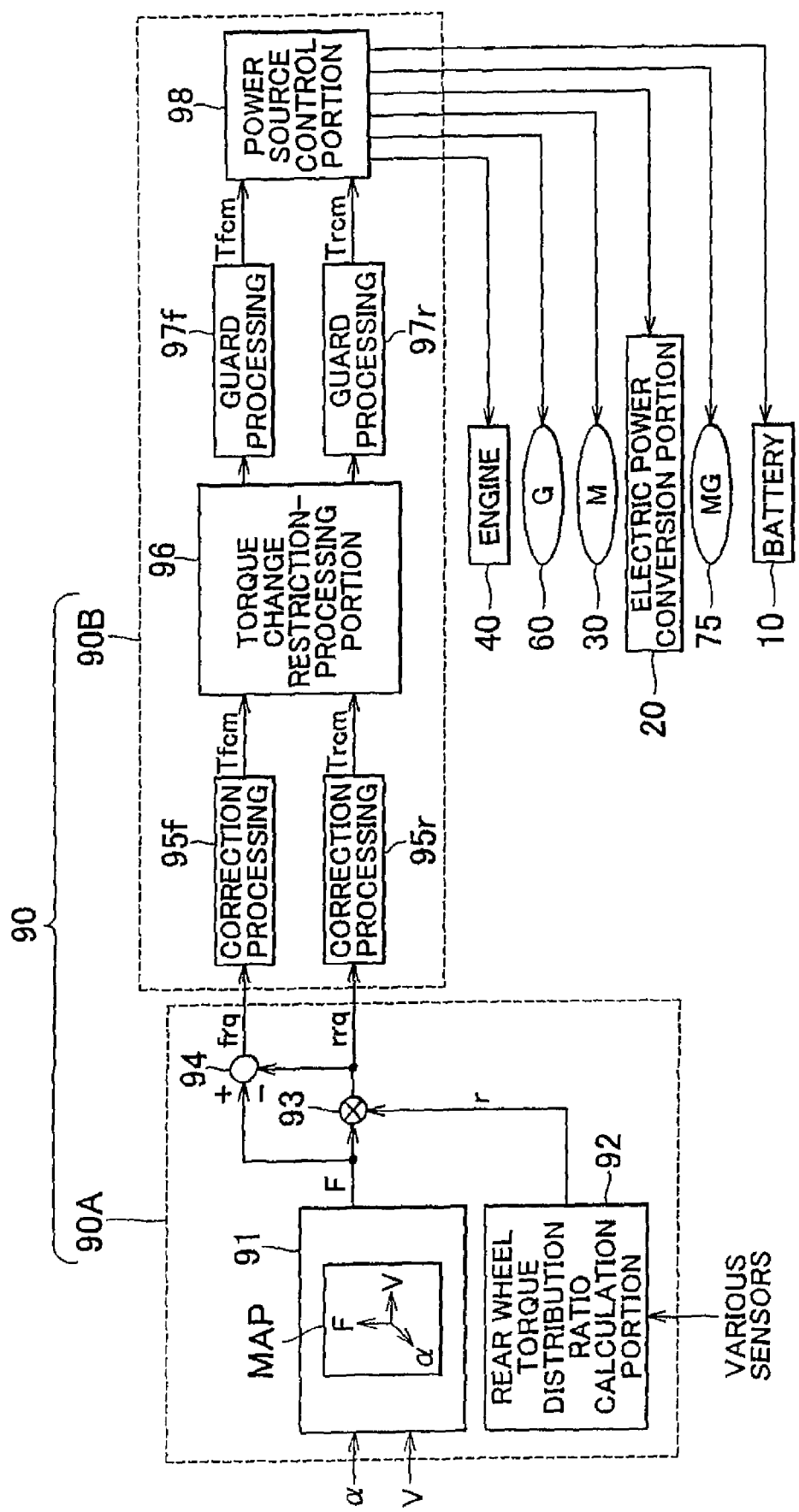
FIG. 2 is a control block diagram of a control device 90 shown in FIG. 1.

FIG. 2 is a control block diagram of the control device 90 shown in FIG. 1. Referring to FIG. 2, the control device 90 includes a drive force calculation portion 90A and a drive force control portion 90B.

The drive force calculation portion 90A includes a requested torque determination portion 91, a rear wheel torque distribution ratio calculation portion 92, a multiplication portion 93, and an addition-subtraction portion 94.

The requested torque determination portion 91 determines a requested drive force (requested torque F) on the basis of the operation state of the hybrid vehicle 100 shown in FIG. 1. As information about the "operation state" of the hybrid vehicle 100, information about the accelerator operation amount α and the vehicle speed V from the accelerator operation amount sensor 120 and the vehicle speed sensor 130 shown in FIG. 1 is sent to the requested torque determination portion 91, respectively. The requested torque determination portion 91 pre-stores a map in which the accelerator operation amount α, the vehicle speed V and the requested torque F are arranged in a correspondence, and determines the requested torque F by referring to this map.

The rear wheel torque distribution ratio calculation portion 92 calculates a rear wheel torque distribution ratio r for realizing an ideal drive force distribution between the front and rear wheels, in accordance with the outputs of various sensors that include the accelerator operation amount sensor 120 and the vehicle speed sensor 130 shown in FIG. 1.

The multiplication portion 93 calculates a rear wheel requested torque rrq as the product of the requested torque F and the rear wheel torque distribution ratio r (rrq=F×r). The addition-subtraction portion 94 calculates a front wheel requested torque frq by subtracting the rear wheel requested torque rrq from the requested torque F (frq=F−rrq).

The drive force control portion 90B includes correction processing portions 95f, 95r, a torque change restriction processing portion 96, guard processing portions 97f, 97r, and a power source control portion 98.

The correction processing portion 95f changes the value of a front wheel, command torque Tfcm in accordance with the value of the front wheel requested torque frq. Likewise, the correction processing portion 95r changes the value of a rear wheel command torque Trcm in accordance with the value of the rear wheel requested torque rrq.

In this embodiment, the rate of change of the front wheel command torque Tfcm is determined at the correction processing portion 95f and the rate of change of the rear wheel command torque Trcm is determined at the correction processing portion 95r so that the rates of change against the passage of time (magnitudes of the amount of change of the command torque value) are different from each other. Due to this, for example, when the hybrid vehicle 100 shown in FIG. 1 is accelerated or decelerated, the torque of the front wheels and the torque of the rear wheels can be changed, taking the vehicle stability and the vehicle behavior into consideration.

The following description will be made on the assumption that the rate of change against the passage of time is greater in the rear wheel command torque Trcm than in the front wheel command torque Tfcm. It is to be noted herein that the rate of change against the passage of time may also be greater in the front wheel command torque Tfcm than in the rear wheel command torque Trcm or the rate of change may also be equal each other.

The torque change restriction processing portion 96 performs a torque change restriction process described later, if the value of the front wheel command torque Tfcm from the correction processing portion 95f and the value of the rear wheel command torque Trcm from the correction processing portion 95r satisfy a torque restriction condition.

The guard processing portion 97f restricts the front wheel command torque Tfcm within an upper limit value (lower limit value) if the front wheel command torque Tfcm exceeds the upper limit value (lower limit value). Likewise, the guard processing portion 97r restricts the rear wheel command torque Trcm within an upper limit value (lower limit value) if the rear wheel command torque Trcm exceeds the upper limit value (lower limit value).

The power source control portion 98 controls the power source 65 and the motor generator 75 shown in FIG. 1, on the basis of the value of the front wheel command torque Tfcm and the value of the rear wheel command torque Trcm. Specifically, the power source control portion 98 outputs the front wheel command torque Tfcm and the rear wheel command torque Trcm to these power sources.

Thus, the control device 90 includes the drive force calculation portion 90A and the drive force control portion 90B. The drive force calculation portion 90A calculates a plurality of requested drive forces (the front wheel requested torque frq and the rear wheel requested torque rrq) that are requested with respect to the plurality of power sources (the power source 65 and the motor generator 75 in FIG. 1), on the basis of the operation state of the vehicle.

The drive force control portion 90B outputs a plurality of command chive forces (the front wheel command torque Tfcm and the rear wheel command torque Trcm) to the plurality of power sources in accordance with the front wheel requested torque frq and the rear wheel requested torque rrq.

In the case where at least one of the front wheel requested torque frq and the rear wheel requested torque rrq changes in sign (e.g., positive or negative), the drive force control portion 90B changes the command torque that corresponds to the sign-changed requested torque, to a predetermined torque (e.g., zero) in a predetermined range. After the corresponding command torque has changed to the predetermined torque in the predetermined range, the drive force control portion 90B restricts the change of the corresponding command torque until the other command torque of the front wheel command torque Tfcm and the rear wheel command torque Trcm reaches the predetermined range (+Tpxnoarea or −Tpxnoarea). After the other command torque reaches the predetermined range, the drive force control portion 90B releases the restriction on the change of the corresponding command torque, and causes the corresponding command torque to follow the requested torque.

That is, in the case where the vehicle accelerates or decelerates, a change in sign of the front wheel requested torque frq (and the rear wheel requested torque rrq) occurs. The drive force control portion 90B first changes the front wheel command torque Tfcm and the rear wheel command torque Trcm so that each of the command torques reaches the predetermined torque in the predetermined range. For example, in the case where the rear wheel command torque Trcm reaches the predetermined torque in the predetermined range earlier than the front wheel command torque Tfcm, the drive force control portion 90B restricts the change of the rear wheel command torque 1 cm (holds the rear wheel command torque Trcm constant) until the front wheel command torque Tfcm reaches the predetermined range. The drive force control portion 90B releases the restriction on the change of the rear wheel command torque Trcm after the front wheel command torque Tfcm and the rear wheel command torque Trcm have entered the predetermined ranges. Due to this, it becomes possible to improve the vehicle stability in the hybrid vehicle 100 shown in FIG. 1. Incidentally, the sign of the rear wheel command torque 1 cm changes to the same sign as the rear wheel requested torque rrq after the restriction on the change of the rear wheel command torque Trcm has been released.

Figure 3:
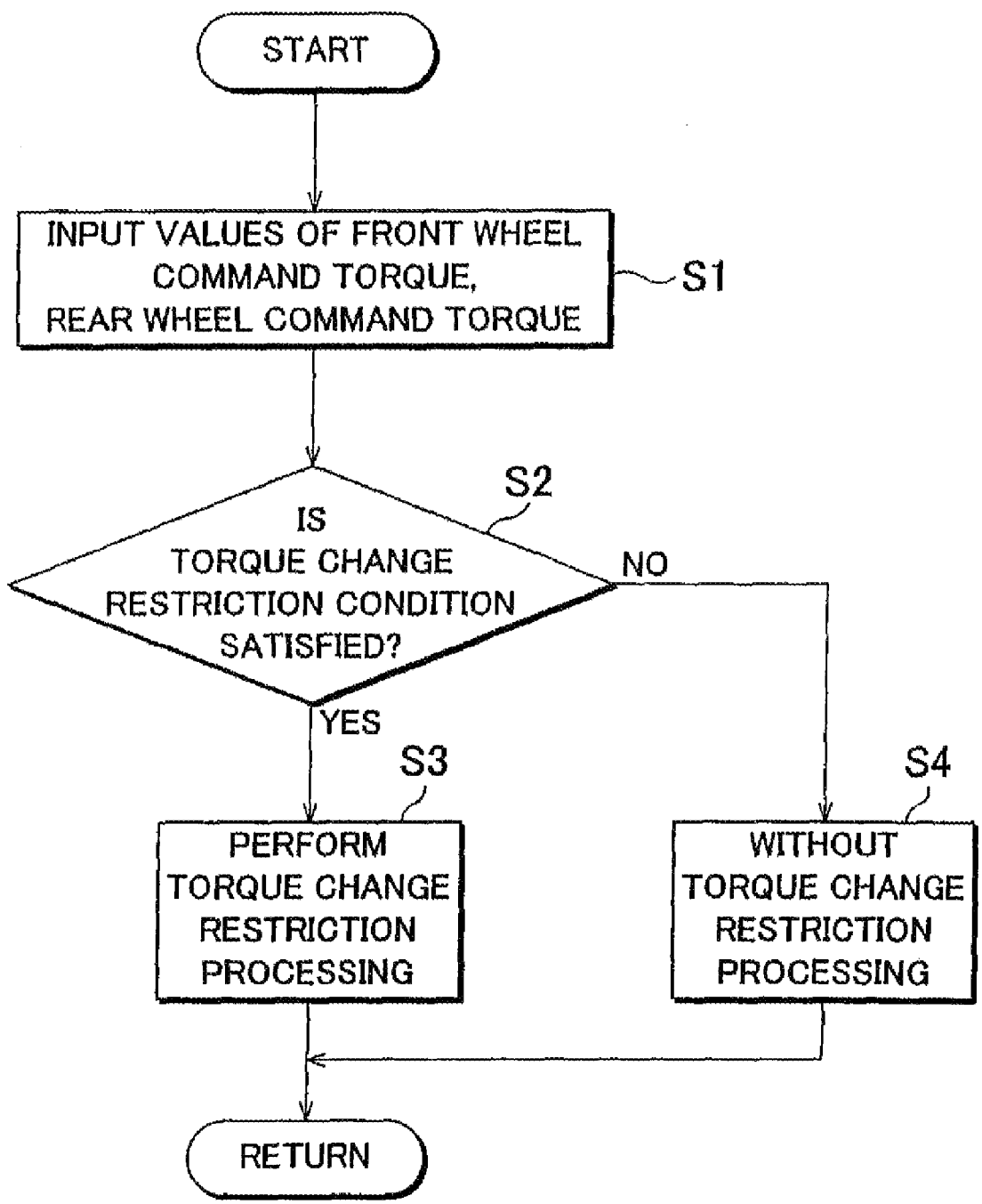
FIG. 3 is a flowchart showing a process performed in a torque change restriction processing portion 96 shown in FIG. 2.

FIG. 3 is a flowchart showing a process performed in the torque change restriction processing portion 96 shown in FIG. 2. Referring to FIGS. 3 and 2, when the process starts, the value of the front wheel command torque Tfcm and the value of rear wheel command torque Trcm are input to the torque change restriction processing portion 96 from the correction processing portions 95f, 95r, respectively, in step S1. In step S2, the torque change restriction processing portion 96 determines whether or not a torque change restriction condition is satisfied between the front wheel command torque Tfcm and the rear wheel command torque Trcm.

If the torque change restriction condition is satisfied (YES in step S2), the process proceeds to step S3. In step S3, the torque change restriction processing portion 96 performs the torque change restriction process of restricting the change of one of the front wheel command torque Tfcm and the rear wheel command torque Trcm. On the other hand, if the torque change restriction condition is not satisfied (NO in step S2), the process proceeds to step S4. In step S4, the torque change restriction processing portion 96 does not perform the torque change restriction process, but immediately outputs the value of the front wheel command torque Tfcm and the value of the rear wheel command torque cm that are input. After the process in step S3 or step S4 ends, the process as a whole returns to step S1.

Figure 4:
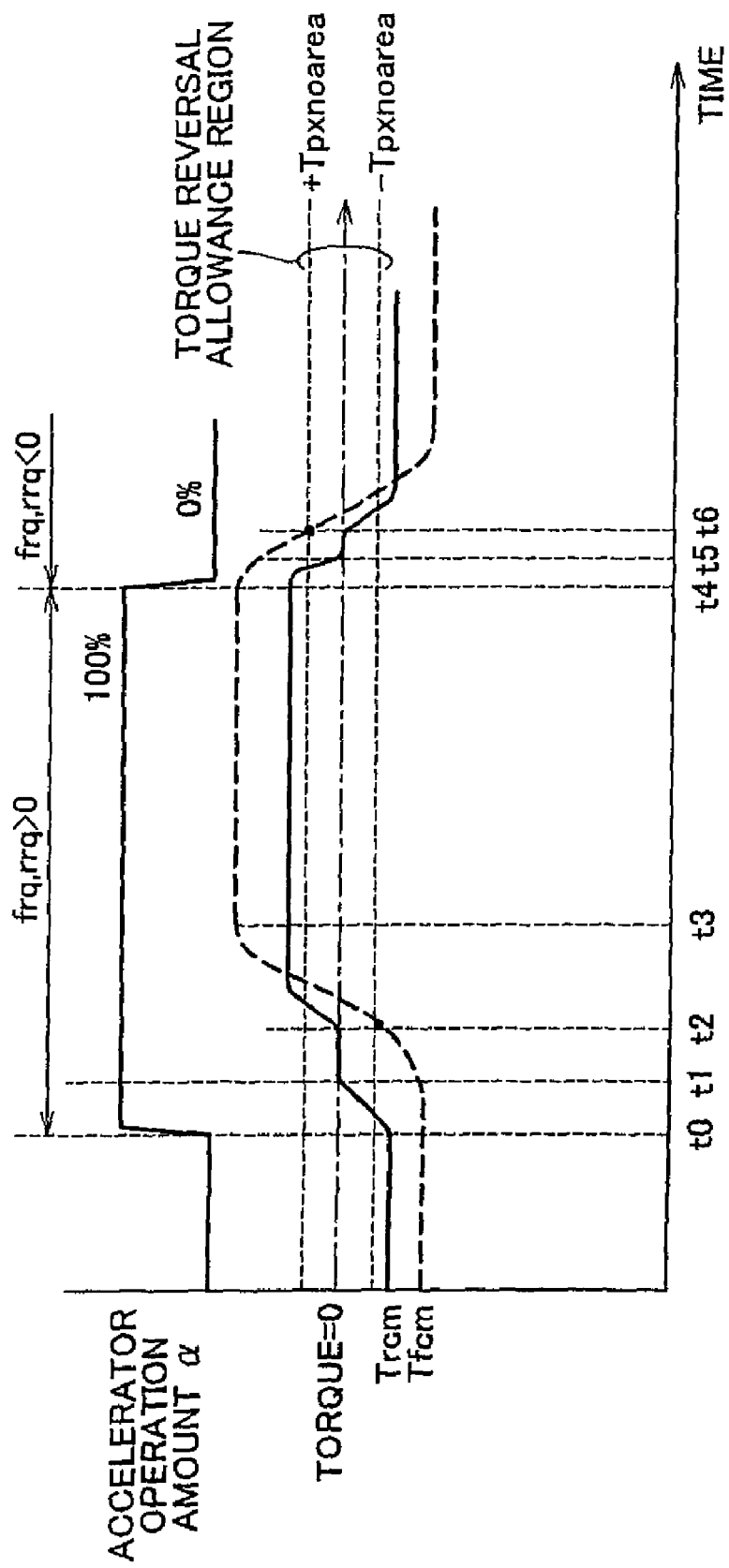
FIG. 4 is a diagram schematically illustrating the changes of the front wheel command torque Tfcm and the rear wheel command torque Trcm controlled by the control device 90 shown in FIG. 2.

FIG. 4 is a diagram schematically illustrating the changes of the front wheel command torque Tfcm and the rear wheel command torque Trcm controlled by the control device 90 shown in FIG. 2.

Referring to FIG. 4, prior to the time to, the accelerator operation amount α is 0%. The front wheel command torque Tfcm and the rear wheel command torque Trcm at this time are both negative. Besides, prior to the time to, the distribution between the front wheel command torque Tfcm and the rear wheel command torque Trcm is determined so that the absolute value of the front wheel command torque Tfcm is greater than the absolute value of the rear wheel command torque Trcm.

After the time to, the accelerator operation amount α is changed from 0% to 100% in order to accelerate the hybrid vehicle. Since the sign of the requested torque F shown in FIG. 2 changes from negative to positive, the signs of the front wheel requested torque frq and the rear wheel requested torque rrq both change from negative to positive. Due to this, the front wheel command torque Trcm and the rear wheel command torque Trcm both change into the positive direction.

Due to the above-described process at the correction processing portions 95f, 95r shown in FIG. 2, the rate of change of the command torque value against the passage of time is greater in the rear wheel command torque Trcm than in the front wheel command torque Tfcm. Between the time t0 and the time t1, the value of the rear wheel command torque Trcm reaches a value in a torque reversal allowance region earlier than the value of the front wheel command torque Tfcm. The "torque reversal allowance region" shown in FIG. 4 is a predetermined range astride zero (ranges from −Tpxnoarea to +Tpxnoarea).

At the time t1, the value of the rear wheel command torque Trcm reaches zero. On the other hand, at the point of the time t1, the value of the front wheel command torque Tfcm is a value outside the torque reversal allowance region (Tfcm<−Tpxnoarea). Consequently, the torque change restriction processing portion 96 shown in FIG. 2 restricts the rise of the rear wheel command torque Trcm until the front wheel command torque Tfcm enters the torque reversal allowance region. Therefore, during the period of the time t1 to the time t2, the rear wheel command torque Trcm is held unchanged at zero.

When the value of the front wheel command torque Tfcm reaches −Tpxnoarea at the time t2, the torque change restriction processing portion 96 releases the restriction on the change of the rear wheel command torque Trcm. The torque change restriction processing portion 96 raises the rear wheel command torque Trcm so as to follow the rear wheel requested torque rrq. Besides, the torque change restriction processing portion 96 continues to raise the front wheel command torque Tfcm. Due to this, at the time t3, the values of the front wheel command torque Tfcm and the rear wheel command torque Trcm reach values that satisfy a certain distribution ratio.

After the time t4, the accelerator operation amount α is changed from 100% to 0% in order to decelerate the hybrid vehicle. At this time, since the sign of the requested torque F changes from positive to negative, the signs of the front wheel requested torque frq and the rear wheel requested torque rrq both change from positive to negative. Due to this, the front wheel command torque Tfcm and the rear wheel command torque Trcm both change into the negative direction. However, at this time, due to the processes at the correction processing portions 95f, 95r shown in FIG. 2, the rate of change of the command torque value against the passage of time is also greater in the rear wheel command torque Trcm than in the front wheel command torque Tfcm.

At the time t5, the value of the rear wheel command torque Trcm reaches zero. On the other hand, at the point of the time t5, the value of the front wheel command torque Tfcm is a value outside the torque reversal allowance region (Tfcm>+Tpxnoarea), Consequently, similarly to the time of acceleration of the vehicle, the torque change restriction processing portion 96 shown in FIG. 2 restricts the decline of the rear wheel command torque Trcm until the front wheel command torque Tfcm enters the torque reversal allowance region. Therefore, during the period of the time t5 to the time t6, the rear wheel command torque Trcm is held unchanged at zero.

When the value of the front wheel command torque Tfcm reaches +Tpxnoarea at the time t6, the torque change restriction processing portion 96 releases the restriction on the change of the rear wheel command torque Trcm. The torque change restriction processing portion 96 causes the rear wheel command torque Trcm to decline and follow the rear wheel requested torque rrq. Besides, the torque change restriction processing portion 96 continues to cause the front wheel command torque Tfcm to decline.

As shown in FIG. 4, during a period after the time t2 or during a period after the time t6, the front wheel command torque Tfcm and the rear wheel command torque Trcm become opposite in sign. However, by setting an appropriate width of the torque reversal allowance region, the difference between the front wheel command torque Tfcm and the rear wheel command torque Trcm can be made small even though the two command torques are opposite in sign. Thus, according to the invention, it becomes possible to improve the vehicle stability in a vehicle that includes a plurality of power sources that drives a plurality of wheels.

The phenomenon in which the sign of the torque is different between the front wheels and the rear wheels can be completely prevented if in the torque change restriction process shown in FIG. 4 the rise and the decline of the rear wheel command torque Trcm are prohibited until the front wheel command torque Tfcm reaches zero. In this case, however there is a possibility of the response delay of the vehicle with respect to driver's operation of the accelerator pedal. By setting the torque reversal allowance region as a range astride zero as shown in FIG. 4 drive force can be generated before the front wheel command torque Tfcm and the rear wheel command torque Trcm become zero, and therefore the response of the vehicle can be improved.

FIG. 5 is a diagram showing the processing conditions of the torque change restriction processing portion 96 shown in FIG. 2, in the form of a table.

Referring to FIG. 5, Conditions 1 to 4 are processing conditions in the case where the requested torques F (i.e., the front wheel requested torque frq and the rear wheel requested torque rrq) are positive, and Conditions 5 to 8 are processing conditions in the case where the requested torques F are negative. The conditions shown in FIG. 5 will be described with reference to FIG. 4 as well.

In the case (Condition 1) where the front wheel command torque Tfcm≧0, the rear wheel command torque Trcm<−Tpxnoarea, the rise of the front wheel command torque Tfcm is prohibited. If in FIG. 4 the front wheel command torque Tfcm and the rear wheel command torque Trcm are interchanged, the rise of the front wheel command torque Trcm is prohibited during the period of the time t1 to the time t2 while the rear wheel command torque Trcm rises. At this time, Condition 1 is satisfied.

In the case (Condition 2) where the front wheel command torque Tfcm≧0 and the rear wheel command torque Trcm≧−Tpxnoarea, the front wheel command torque Tfcm and the rear wheel command torque Trcm rise without being processed. If the front wheel command torque Tfcm and the rear wheel command torque Trcm are interchanged in FIG. 4, the front wheel command torque Tfcm and the rear wheel command torque Trcm rise from the time t2 on. At this time, Condition 2 is satisfied.

In the case (Condition 3) where front wheel command torque Tfcm<−Tpxnoarea and the rear wheel command torque Trcm≧0 the rise of the rear wheel command torque Trcm is prohibited. In FIG. 4, during the period of the time t1 to the time t2, the rise of the rear wheel command torque Trcm is prohibited and the front wheel command torque Tfcm rises. At this time, Condition 3 is satisfied.

In the case (Condition 4) where the front wheel command torque Tfcm≧−Tpxnoarea and the rear wheel command torque Trcm≧0, the front wheel command torque Tfcm and the rear wheel command torque Trcm rise without being processed. From the time t2 on in FIG. 4, the front wheel command torque Tfcm and the rear wheel command torque Trcm rises. At this time, Condition 4 is satisfied.

In the case (Condition 5) where the front wheel command torque Tfcm≦0 and the rear wheel command torque Trcm>Tpxnoarea, the decline of the front wheel command torque Tfcm is prohibited. If the front wheel command torque Tfcm and the rear wheel command torque Trcm are interchanged in FIG. 4, the decline of the front wheel command torque Tfcm is prohibited during the period of the time t5 to the time t6 while the rear wheel command torque Trcm declines. At this time, Condition 5 is satisfied.

In the case (Condition 6) where the front wheel command torque Tfcm≦0 and the rear wheel command torque Trcm≦Tpxnoarea, the front wheel command torque Tfcm and the rear wheel command torque Trcm decline without being processed. If the front wheel command torque Tfcm and the rear wheel command torque Trcm are interchanged in FIG. 4, the front wheel command torque Tfcm and the rear wheel command torque Trcm decline from the time t6 on. At this time, Condition 6 is satisfied.

In the case (Condition 7) where the front wheel command torque Tfcm>Tpxnoarea and the rear wheel command torque Trcm≦0, the decline of the rear wheel command torque Trcm is prohibited. In FIG. 4, during the period of the time t5 to the time t6, the decline of the rear wheel command torque Trcm is prohibited and the front wheel command torque Tfcm declines. At this time, Condition 7 is satisfied.

In the case (Condition 8) where the front wheel command torque Tfcm≦Tpxnoarea and the rear wheel command torque Trcm≦0, the front wheel command torque Tfcm and the rear wheel command torque Trcm decline without being processed. From the time t6 on in FIG. 4, the front wheel command torque Tfcm and the rear wheel command torque Trcm decline. At this time, Condition 8 is satisfied.

Figure 6:
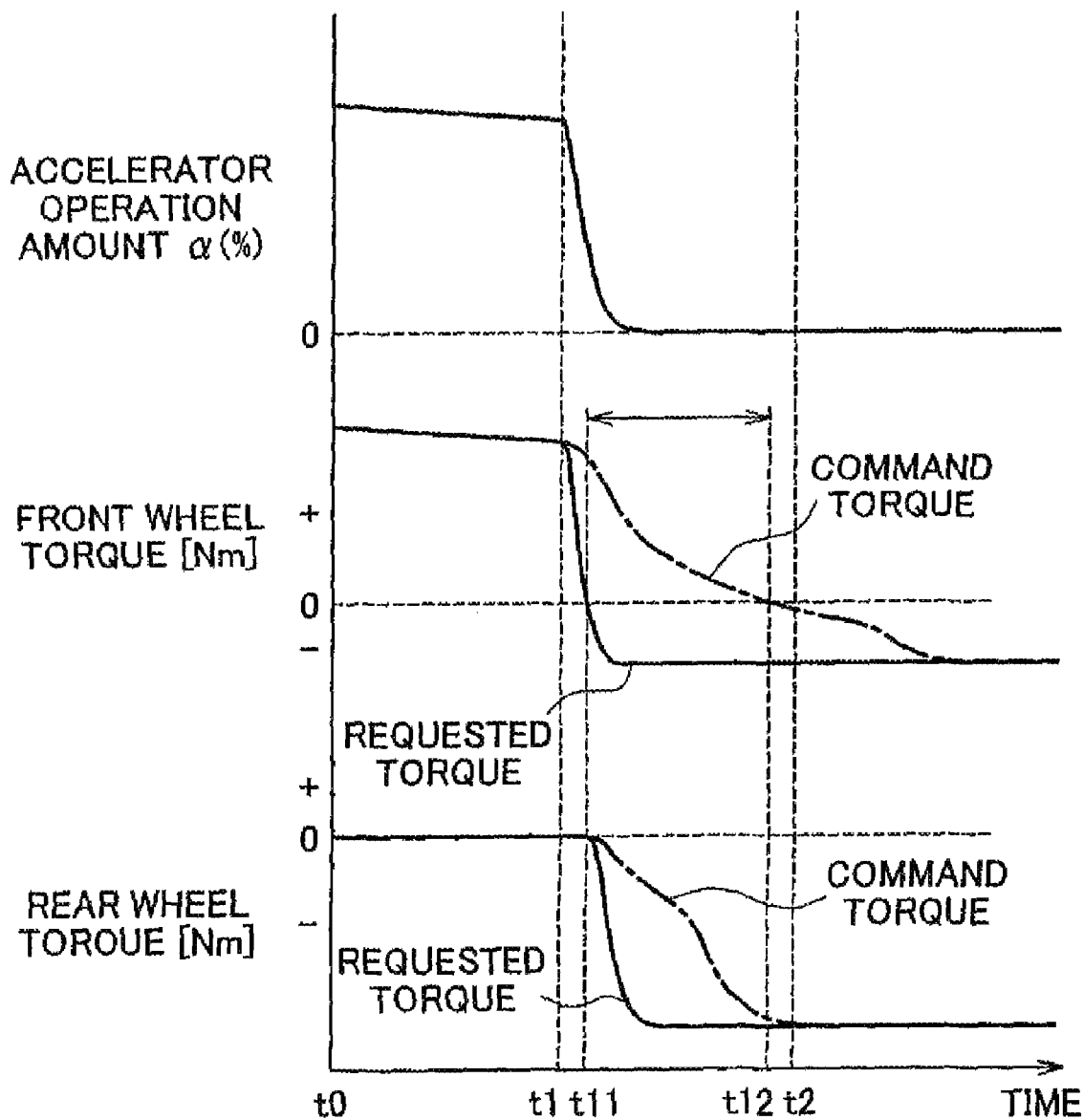
FIG. 6 is a diagram showing results of a simulation of the torque changes on the front and rear wheels of a hybrid vehicle 100 shown in FIG. 1 in the case where the torque change restriction process is not performed.

FIG. 6 is a diagram showing results of a simulation of the torque changes on the front and rear wheels of the hybrid vehicle 100 shown in FIG. 1 in the case where the torque change restriction process is not performed.

Referring to FIG. 6, there are shown the changes of the front wheel torques (the front wheel requested torque and the front wheel command torque) and the changes of the rear wheel torques (the rear wheel requested torque and the rear wheel command torque) occurring when the accelerator operation amount is returned from a certain value to 0%. Incidentally, the time t0 is a time that serves as a reference for the torque change.

During the period of the time t0 to the time to, the accelerator operation amount α>0. During this period, the front wheel requested torque and the front wheel command torque are both positive values, the rear wheel requested torque and the rear wheel command torque are both zero.

From the time t1 on, the front wheel requested torque sharply decreases in accordance with sharp decreases of the accelerator operation amount α. At the time t11, the front wheel requested torque reaches zero, but the sign of the front wheel command torque is still positive. A reason for this is that the change of the front wheel command torque is restricted by the correction processing portion 95f shown in FIG. 2 (the correction process is performed).

During the period of the time t11 to the time t12, the rear wheel requested torque and the rear wheel command torque both decreases from zero. Therefore, the rear wheel command torque is negative. On the other hand, the value of the front wheel command torque decreases is positive during tris period. That is, the sign of the front wheel command torque and the sign of the rear wheel command torque are opposite during this period.

Figure 7:
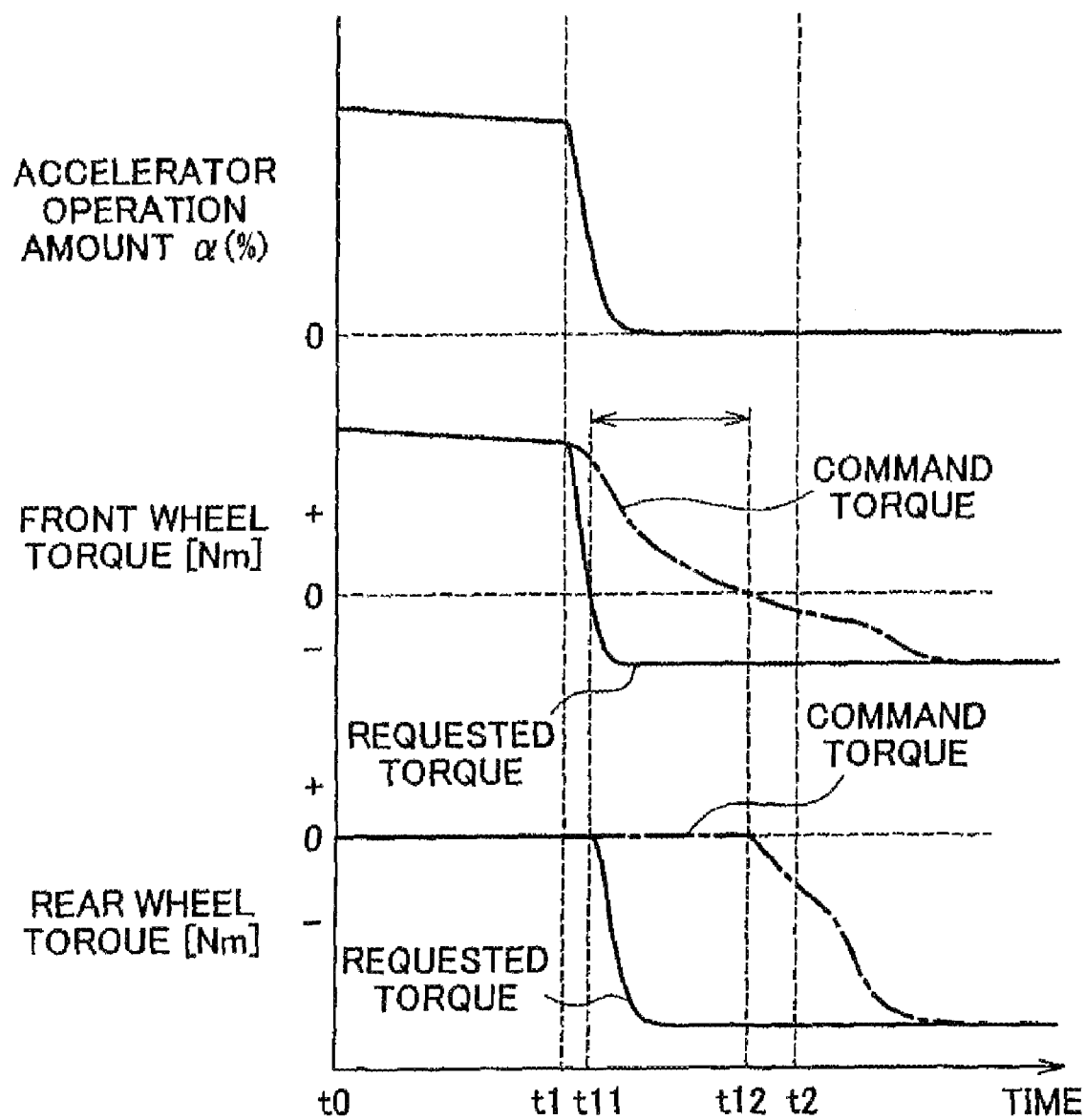
FIG. 7 is a diagram showing results of a simulation of the torque changes on the front and rear wheels of the hybrid vehicle 100 shown in FIG. 1 in the case where the torque change restriction process is performed.

FIG. 7 is a diagram showing results of a simulation of the torque changes on the front and rear wheels of the hybrid vehicle 100 shown in FIG. 1 in the case where the torque change restriction process is performed. In FIG. 7, the times t0, t1, t11, t12 correspond to the times t0, t1, t11, t12 in FIG. 6, respectively.

Similarly to the results shown in FIG. 6, when the accelerator operation amount α is rapidly decreased at the time t1, the rear wheel requested torque decreases from zero during the period of the time t11 and the time t12. At this time, due to the torque change restriction process, the value of the rear wheel command torque continues to remain at zero until the front wheel command torque reaches a value within the torque reversal allowance region.

As the front wheel command torque reaches a value in the torque reversal allowance region at the time t12, the value of the rear wheel command torque starts to decrease (changes into the negative direction). At the point of the time t12, although the sign of the command torque is different between the front wheels and the rear wheels, the difference in the command torque therebetween is small as compared with FIG. 6. In both FIG. 6 and FIG. 7, the value of the front wheel command torque and the value of the rear wheel command torque are both negative at the time t2.

As described above, according to this embodiment, the control device 90, when changing the front wheel command torque Tfcm and the rear wheel command torque Trcm, restricts the change of one of the two command torques until the other reaches a predetermined range, provided that the former one of the command torques reaches the predetermined torque value within the predetermined range. Therefore, according to the embodiment, it becomes possible to improve the vehicle stability in a vehicle that includes a plurality of power sources that drives a plurality of wheels.

Furthermore, according to the embodiment, by setting the torque reversal allowance region as a range astride zero, it is possible to generate drive force before the front wheel command torque Tfcm and the rear wheel command torque Trcm become zero. Therefore, the response of the vehicle can be improved.

In the foregoing description, the plurality of power sources are made up of the first power source that drives the two front wheels, and the second power source that drives the two rear wheels. However, the invention is also applicable to vehicles in which a plurality of power sources (e.g., four power sources) that drives a plurality of wheels (e.g., four wheels), respectively, are provided.

It is to be understood that the embodiments disclosed in this application are not restrictive but illustrative in all respects. The scope of the invention is shown not by the foregoing description but by the claims for patent, aid is intended to include all the modifications that are in the meaning and scope equivalent to those of the claims for patent.

The invention claimed is:

1. A control device for a vehicle comprising:
   a requested drive force calculation portion that calculates a plurality of requested drive forces that are requested with respect to the plurality of power sources, respectively, based on an operation state of the vehicle including a plurality of power sources driving a plurality of wheels; and
   a drive force control portion that outputs a plurality of command drive forces to the plurality of power sources, respectively, in accordance with the plurality of requested drive forces, wherein if a sign of at least one requested drive force of the plurality of requested drive forces changes, the drive force control portion changes the command drive force corresponding to the at least one requested drive force to a predetermined drive force in a predetermined range, and after the corresponding command drive force changes to the predetermined drive force in the predetermined range, the drive force control portion restricts a change of the corresponding command drive force until another command drive force of the plurality of command drive forces reaches the predetermined range, and after the another command drive force reaches the predetermined range, the drive force control portion releases restriction on the change of the corresponding command drive force and causes the corresponding command drive force to follow the at least one requested drive force.

2. The control device for the vehicle according to claim 1, wherein the predetermined drive force in the predetermined range is astride zero.

3. The control device for the vehicle according to claim 2, wherein the plurality of power sources are a first power source and a second power source, wherein the first power source drives two front wheels of the plurality of wheels, and wherein the second power source drives two rear wheels of the plurality of wheels.

4. The control device for the vehicle according to claim 1, wherein the plurality of command drive forces are different from each other in a rate of change against passage of time.

5. The control device for the vehicle according to claim 4, wherein the plurality of power sources are a first power source and a second power source, wherein the first power source drives two front wheels of the plurality of wheels, and wherein the second power source drives two rear wheels of the plurality of wheels.

6. The control device for the vehicle according to claim 1, wherein the plurality of power sources are a first power source and a second power source, wherein the first power source drives two front wheels of the plurality of wheels, and wherein the second power source drives two rear wheels of the plurality of wheels.

7. A control method for a vehicle that includes a plurality of power sources that drives a plurality of wheels comprising:
   calculating, by a control device for the vehicle, a plurality of requested drive forces that are requested with respect to the plurality of power sources, respectively, based on an operation state of the vehicle;
   changing a command drive force corresponding to at least one requested drive force to a predetermined drive force in a predetermined range if a sign of the at least one requested drive force of the plurality of requested drive forces changes;
   restricting a change of the corresponding command drive force after the corresponding command drive force changes to the predetermined drive force in the predetermined range until another command drive force reaches the predetermined range; and
   releasing restriction on the change of the corresponding command drive force after the another command drive force reaches the predetermined range, and causing the corresponding command drive force to follow the at least one requested drive force.

* * * * *